(12) United States Patent
Zhang et al.

(10) Patent No.: US 11,400,553 B2
(45) Date of Patent: Aug. 2, 2022

(54) TUBE FIXTURE AND SYSTEM

(71) Applicant: The Boeing Company, Chicago, IL (US)

(72) Inventors: Hongda Zhang, Winnipeg (CA); Gang Qi, Winnipeg (CA); Yee-Ying Chung, Winnipeg (CA); Garth Cook, Oakbank (CA)

(73) Assignee: The Boeing Company, Chicago, IL (US)

( * ) Notice: Subject to any disclaimer, the term of this patent is extended or adjusted under 35 U.S.C. 154(b) by 427 days.

(21) Appl. No.: 15/844,287

(22) Filed: Dec. 15, 2017

(65) Prior Publication Data

US 2019/0184508 A1  Jun. 20, 2019

(51) Int. Cl.
| | |
|---|---|
| B23Q 3/06 | (2006.01) |
| B23Q 3/10 | (2006.01) |
| B25B 1/24 | (2006.01) |
| B23Q 3/08 | (2006.01) |
| B25B 13/04 | (2006.01) |

(52) U.S. Cl.
CPC ............ B23Q 3/065 (2013.01); B23Q 3/082 (2013.01); B23Q 3/106 (2013.01); B25B 1/241 (2013.01); B25B 13/04 (2013.01)

(58) Field of Classification Search
CPC .......... B23B 31/40; B23Q 3/08; B23Q 3/065; B23Q 3/064; B23Q 3/082; B23Q 3/106; B25B 5/065; B25B 11/00
USPC ........................................ 269/22; 254/93 HP
See application file for complete search history.

(56) References Cited

U.S. PATENT DOCUMENTS

| | | | |
|---|---|---|---|
| 1,457,496 A * | 6/1923 | Butler ................. | B65D 81/052 206/522 |
| 3,233,315 A * | 2/1966 | Levake ................ | F16L 1/10 29/237 |
| 3,253,854 A * | 5/1966 | Hollander, Jr. ..... | B66C 1/46 294/119.2 |
| 3,754,748 A * | 8/1973 | Parker ................ | G01M 1/045 157/15 |
| 4,253,694 A | 3/1981 | Walter et al. | |
| 4,680,246 A * | 7/1987 | Aoki .................. | B05C 3/09 118/500 |
| 4,989,909 A | 2/1991 | Bouligny, Jr. et al. | |
| 5,322,300 A | 6/1994 | Mistrater et al. | |
| 6,302,364 B1 * | 10/2001 | Chiueh ............... | B60N 3/10 206/545 |
| 8,424,857 B2 | 4/2013 | Green et al. | |
| 2003/0226771 A1 * | 12/2003 | Corboy ............... | F42B 39/22 206/3 |
| 2006/0118235 A1 * | 6/2006 | Lum .................. | B64F 5/10 156/285 |
| 2009/0035470 A1 * | 2/2009 | Chen .................. | G03G 15/2053 427/372.2 |

(Continued)

*Primary Examiner* — Lee D Wilson
*Assistant Examiner* — Aaron R McConnell
(74) *Attorney, Agent, or Firm* — Kunzler Bean & Adamson

(57) ABSTRACT

A fixture for holding a barrel-shaped part, including an interior surface, in a fixed position includes a body configured to fit inside the barrel-shaped part and a support ring coupled to the body. The support ring includes a peripheral channel. The fixture further includes a bladder tube engaged with the peripheral channel of the support ring and inflatable to engage the interior surface of the barrel-shaped part when the body is inside the barrel-shaped part.

20 Claims, 7 Drawing Sheets

(56) References Cited

U.S. PATENT DOCUMENTS

2010/0164187 A1* 7/2010 Geng .................... B23B 31/305
279/2.07
2019/0111674 A1* 4/2019 Dodd .................. B41F 15/0818

* cited by examiner

TUBE FIXTURE AND SYSTEM

FIELD

This disclosure relates generally to fixtures, and more particularly to a fixture and system for engaging an interior surface of a barrel-shaped part.

BACKGROUND

Parts need to be held in a fixed position for many reasons including while applying fabrication or manufacturing processes among other things. Large forces are sometimes exerted on the parts which may necessitate large reactionary forces to properly hold the parts in a fixed position while not damaging or distorting the parts. This can be especially difficult for barrel-shaped parts in which the fixture is engaging an inner surface of the parts. Current techniques may unnecessarily damage or distort the parts and provide uneven loading on the parts. Securing parts to prevent movement during a machining operation is also difficult.

SUMMARY

The subject matter of the present application has been developed in response to the present state of the art, and in particular, in response to the problems and disadvantages associated with conventional fixtures that have not yet been fully solved by currently available techniques. Accordingly, the subject matter of the present application has been developed to provide embodiments of a system, an apparatus, and a method that overcome at least some of the above-discussed shortcomings of prior art techniques. For example, according to one implementation, a fixture for holding a barrel-shaped part, including an interior surface, in a fixed position is disclosed, which facilitates a myriad fabrication processes to be performed without damaging or distorting the barrel-shaped part.

Disclosed herein is a fixture for holding a barrel-shaped part, including an interior surface, in a fixed position. The fixture includes a body configured to fit inside the barrel-shaped part and a support ring coupled to the body. The support ring includes a peripheral channel. The fixture further includes a bladder tube engaged with the peripheral channel of the support ring and inflatable to engage the interior surface of the barrel-shaped part when the body is inside the barrel-shaped part. The preceding subject matter of this paragraph characterizes example 1 of the present disclosure.

The fixture further includes a plurality of support rings coupled to the body and a plurality of bladder tubes each engaged with the peripheral channel of a respective support ring of the plurality of support rings. The preceding subject matter of this paragraph characterizes example 2 of the present disclosure, wherein example 2 also includes the subject matter according to example 1, above.

A shape of one of the plurality of support rings is different than a shape of another one of the plurality of support rings. The preceding subject matter of this paragraph characterizes example 3 of the present disclosure, wherein example 3 also includes the subject matter according to example 2, above.

The body includes a central axis and the plurality of support rings are spaced apart along the central axis. The preceding subject matter of this paragraph characterizes example 4 of the present disclosure, wherein example 4 also includes the subject matter according to any one of examples 2-3, above.

The bladder tube includes a non-circular cross-sectional profile. The preceding subject matter of this paragraph characterizes example 5 of the present disclosure, wherein example 5 also includes the subject matter according to any one of examples 1-4, above.

The bladder tube includes a lens-shaped cross-sectional profile. The preceding subject matter of this paragraph characterizes example 6 of the present disclosure, wherein example 6 also includes the subject matter according to any one of examples 1-5, above.

The support ring has a non-circular shape. The preceding subject matter of this paragraph characterizes example 7 of the present disclosure, wherein example 7 also includes the subject matter according to any one of examples 1-6, above.

The support ring has a circular shape. The preceding subject matter of this paragraph characterizes example 8 of the present disclosure, wherein example 8 also includes the subject matter according to any one of examples 1-7, above.

The bladder tube is made of a flexible elastomeric material. The preceding subject matter of this paragraph characterizes example 9 of the present disclosure, wherein example 9 also includes the subject matter according to any one of examples 1-8, above.

The peripheral channel of the support ring is a continuous ring surrounding the body. The preceding subject matter of this paragraph characterizes example 10 of the present disclosure, wherein example 10 also includes the subject matter according to any one of examples 1-9, above.

The peripheral channel of the support ring has a U-shaped cross-sectional profile. The preceding subject matter of this paragraph characterizes example 11 of the present disclosure, wherein example 11 also includes the subject matter according to any one of examples 1-10, above.

Also disclosed herein is a system. The system includes a gas reservoir including a gas, and a fixture for holding a barrel-shaped part, including an interior surface, in a fixed position. The fixture includes a body configured to fit inside the barrel-shaped part and a support ring coupled to the body. The support ring includes a peripheral channel. The fixture further includes a bladder tube engaged with the peripheral channel of the support ring and inflatable with the gas from the gas reservoir to engage the interior surface of the barrel-shaped part when the body is inside the barrel-shaped part. The preceding subject matter of this paragraph characterizes example 12 of the present disclosure.

The system further includes a plurality of support rings coupled to the body, wherein the plurality of support rings are spaced apart along the body, and a plurality of bladder tubes each engaged with the peripheral channel of a respective support ring of the plurality of support rings and each inflatable with the gas from the gas reservoir. The preceding subject matter of this paragraph characterizes example 13 of the present disclosure, wherein example 13 also includes the subject matter according to example 12, above.

The system further includes a pressure regulator configured to equalize pressure of gas within the plurality of bladder tubes. The preceding subject matter of this paragraph characterizes example 14 of the present disclosure, wherein example 14 also includes the subject matter according to example 13, above.

The peripheral channel of the support ring includes an aperture through which gas from the gas reservoir flows into the bladder tube. The preceding subject matter of this paragraph characterizes example 15 of the present disclosure, wherein example 15 also includes the subject matter according to any one of examples 12-14, above.

Also disclosed herein is a method. The method includes positioning a barrel-shaped part over a fixture, the fixture including a body and a support ring coupled to the body, the support ring including a peripheral channel. The method also includes inflating a bladder tube coupled to the peripheral channel of the support ring to fill a space between the peripheral channel and an interior surface of the barrel-shaped part to fix the barrel-shaped part to the fixture. The preceding subject matter of this paragraph characterizes example 16 of the present disclosure.

The method further includes fabricating an exterior surface of the barrel-shaped part while the barrel-shaped part is fixed to the fixture. The preceding subject matter of this paragraph characterizes example 17 of the present disclosure, wherein example 17 also includes the subject matter according to example 16, above.

The method further includes inflating a plurality of bladder tubes coupled to respective peripheral channels of a plurality of support rings to fix the barrel-shaped part to the fixture. The preceding subject matter of this paragraph characterizes example 18 of the present disclosure, wherein example 18 also includes the subject matter according to any one of examples 16 or 17, above.

The method further includes inflating the plurality of bladder tubes to an equalized pressure. The preceding subject matter of this paragraph characterizes example 19 of the present disclosure, wherein example 19 also includes the subject matter according to any one of examples 16-18, above.

The method further includes inflating the plurality of bladder tubes to different pressures. The preceding subject matter of this paragraph characterizes example 20 of the present disclosure, wherein example 20 also includes the subject matter according to any one of examples 16-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
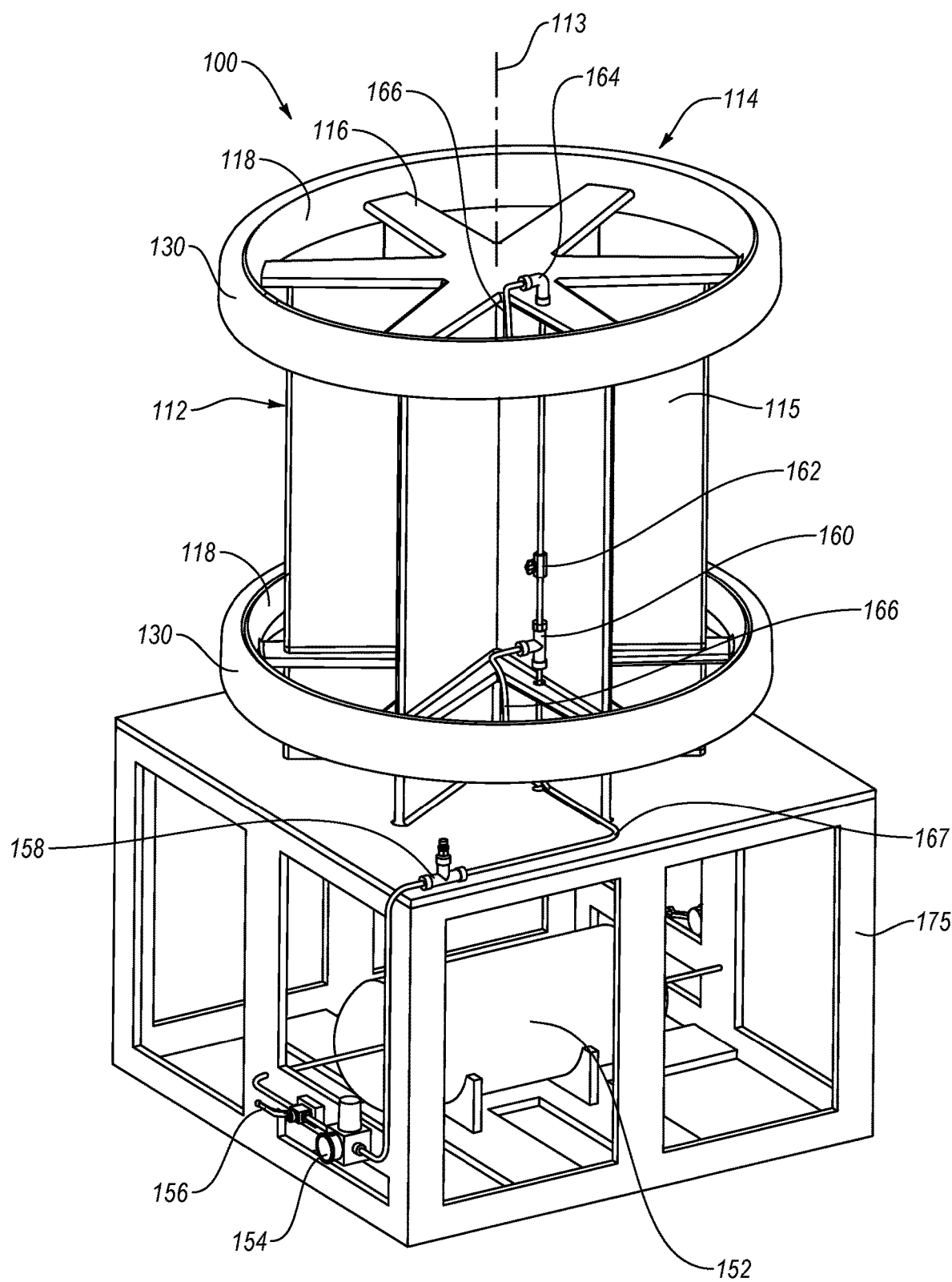
FIG. 1 is a perspective view of a system including a gas reservoir and a fixture, according to one or more embodiments of the present disclosure.
Figure 2:
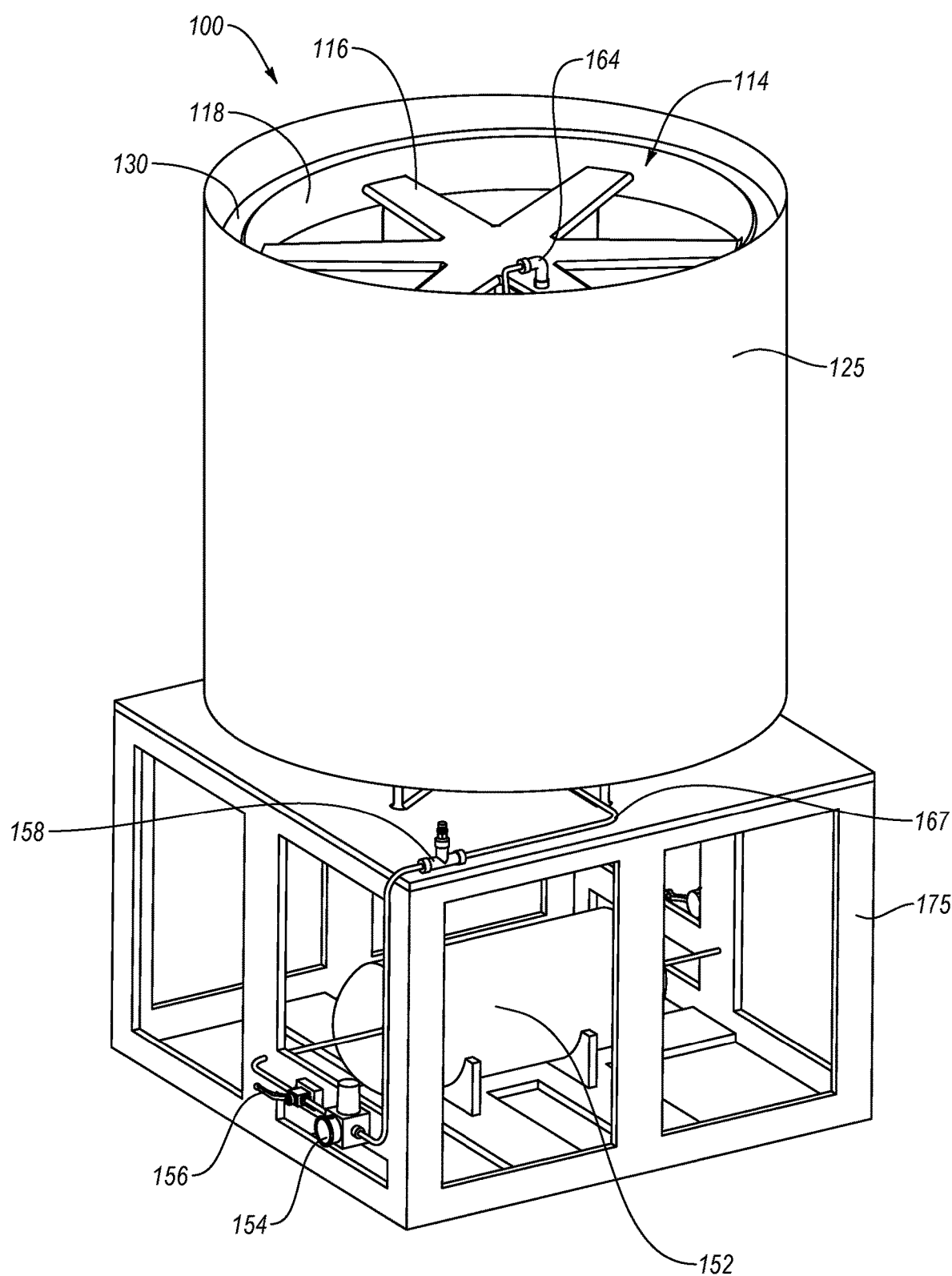
FIG. 2 is a perspective view of the system with a barrel-shaped part engaging the bladder tubes of the fixture, according to one or more embodiments of the present disclosure.

Referring to FIGS. 1 and 2, one embodiment of a system 100 is shown. The system 100 is used to fix a part, such as a barrel-shaped part 125 (see, e.g., FIG. 2), from an interior of the part, while additional manufacturing process are imparted onto an exterior of the part. As described in more detail below, the system 100 includes a fixture 110 and a pressure system 150.

The fixture 110 is configured to hold a barrel-shaped part 125 in a fixed position. While depicted as a hollow cylindrical part with a circular cross-sectional shape with a linear central axis, the barrel-shaped part 125 may have any of various non-circular cross-sectional shapes and may have a non-linear central axis. The barrel-shaped part 125 has an interior surface 127, and components of the fixture 110 are configured to engage the interior surface 127 so as to fix the barrel-shaped part 125 to the fixture 110.

The fixture 110 includes a body 112. The body 112 is a central structural component configured to fit inside the barrel-shaped part 125. More specifically, the body 112 is configured to fit between the interior surface 127 of the barrel-shaped part 125. The body 112 includes six fin-shaped panels 115 that extend outward from a central axis 113 of the body 112. The six fin-shaped panels 115 extend at least a portion of a length of the fixture 110 along the central axis 113. While the illustrated embodiment includes six fin-shaped panels 115, other embodiments may include more (or less) fin-shaped panels 115. In addition, while the illustrated embodiment of the body 112 includes six fin-shaped panels 115, other embodiments of the body 112 may have other shapes or configurations including a hollow or solid cylinder or a rectangular box that is configured to fit inside the barrel-shaped part 125.

The fixture 110 includes two support rings 114 coupled to the body 112. The support rings 114 are integral to the body 112. The support rings 114 and the body 112 may be a monolithic construction. In other embodiments, the support rings 114 are removably attached to the body 112 in a fixed position relative to the body 112. The support rings 114 may be constructed of the same material as the body 112 or another material.

The support rings 114 are spaced apart along the central axis 113 of the body 112. The fixture 110 includes one upper support ring 114 positioned at one end of the body 112 (shown at the top of FIG. 1) and another lower support ring 114 spaced apart and below the upper support ring 114. While described as upper and lower support rings 114 for ease in describing the relative position of the supports rings, it is contemplated that the fixture 110 may be oriented in any direction.

With two or more support rings 114, the fixture 110 engages the interior surface 127 of the barrel-shaped part 125 and stabilizes the barrel-shaped part 125 in a fixed position (see, for example, FIG. 2). The two support rings 114 may be positioned anywhere along the length of the body 112. The two support rings 114 are configured to be positioned such that they engage the interior surface 127 of the barrel-shaped part 125 at opposite ends of the barrel-shaped part 125.

In some embodiments, the support rings 114 may be re-positionable along the length of the body 112. That is, the support rings 114 may be adjusted along the length of the body 112 to allow the support rings 114 to be fixed at differing distances between one another. With support rings 114 that are re-positionable along the length of the body 112, the fixture 110 may be adjusted to function with barrel-shaped parts 125 of differing lengths or perform different manufacturing processes on the same barrel-shaped part 125.

While shown with two support rings 114, in some embodiments the fixture 110 may include a single support ring 114. A single support ring 114 may be sufficient for shorter parts. Other embodiments may include more than two supports rings 114. Longer parts may need more than two support rings 114 so that the distance between each support ring 114 is not too large. Larger separation distances may leave the part susceptible to deformations or distortions during processing steps while the part is held in a fixed position.

The shape of the two support rings 114 may vary. That is, the perimeter shape formed by the peripheral channel 118 may be different. In some embodiments, the shape of one of the plurality of support rings 114 is different than a shape of another one of the plurality of support rings 114. Referring to FIG. 1, the shape of the upper support ring 114 is different than the shape of the lower support ring 114. The upper support ring 114 has a non-circular shape. More specifically, the upper support ring 114 has an oval shape. The lower support ring 114 has a circular shape. The fixture 110 is configured to engage a barrel-shaped part 125 which has a circular interior surface 127 at a first end of the barrel-shaped part 125 and an oval shaped interior surface 127 at the opposite end of the barrel-shaped part 125.

In embodiments where the support rings 114 are removable from the body 112, different shaped or sized support rings 114 may be coupled to the body 112 to allow for the fixture 110 to be used for differently shaped parts. As an example, a larger diameter circular support ring 114 and a smaller diameter circular support ring 114 may be coupled to the body 112 for holding a conical barrel-shaped part in a fixed position.

The support rings 114 include structural supports 116 which extend outward from the body 112 and structurally support a peripheral channel 118 which is a continuous ring or rim surrounding the body 112. While the structural supports 116 are depicted as spokes, in other embodiments, the structural supports 116 may be a solid disk that extends from the body 112 to the peripheral channel 118.

Figure 7:
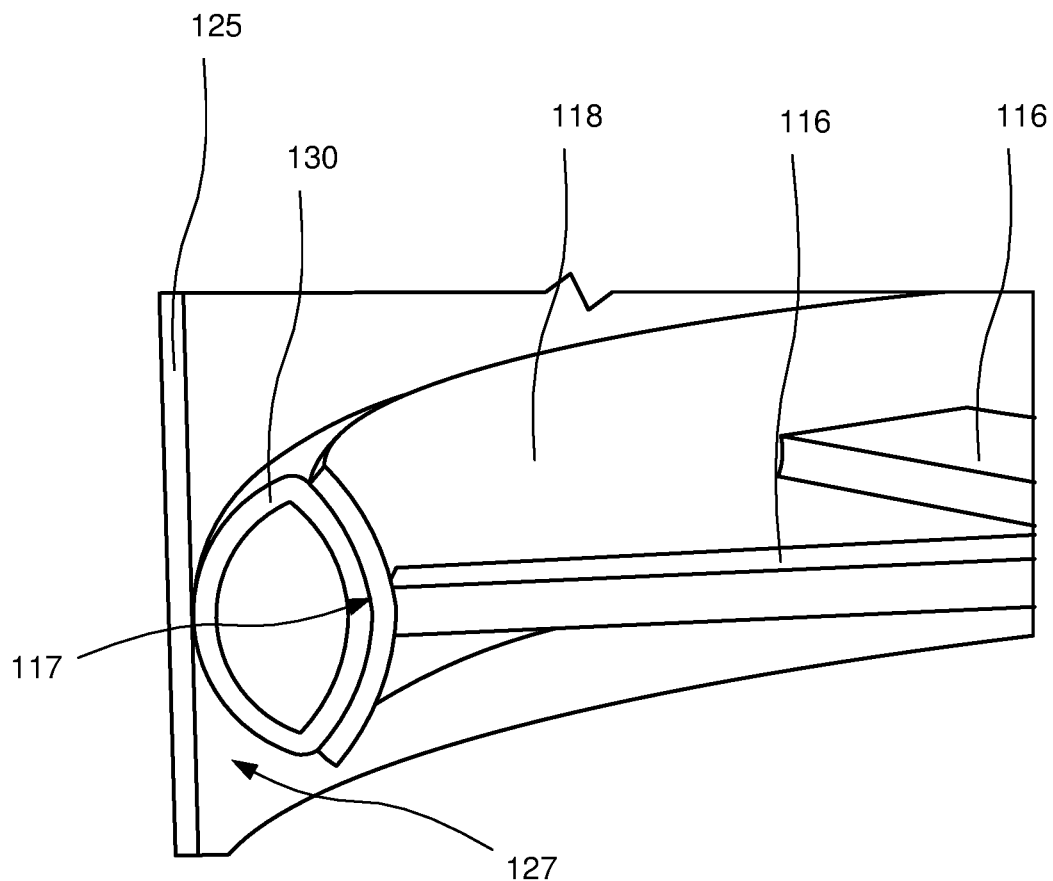
FIG. 7 is a cross-sectional view of a bladder tube and support ring, according to one or more embodiments of the present disclosure.

The peripheral channel 118 is shaped to form a cavity extending around the perimeter of the support ring 114. The peripheral channel 118 may include a U-shaped cross-sectional profile (see, for example, FIG. 7). The peripheral channel 118 is configured to be shaped to hold in place bladder tubes 130. The cross-sectional profile of the peripheral channel 118 may include other shapes which function to hold in place the bladder tubes 130, including but not limited to, V-shaped, C-shaped, trapezoidal-shaped, etc.

The U-shaped cross-sectional profile is configured to stabilize bladder tubes 130 which are engaged with the peripheral channels 118 of the support rings 114. The edges of the peripheral channel 118 located at the tips of the U-shaped cross-sectional profile restrict the bladder tubes 130 from moving in a direction along the length of the central axis 113. The peripheral channels 118 hold the bladder tubes 130 in place when the bladder tubes 130 are inflated to engage and press against the interior surface 127 of the barrel-shaped part 125. In some embodiments, the bladder tubes 130 are positioned within the peripheral channels 118. In some embodiments, the bladder tubes 130 are stretched around the peripheral channels 118. The bladder tubes 130 may be fixedly attached to the peripheral channel 118 at one or more points or removably attached to the peripheral channel 118 at one or more points.

The bladder tubes 130 are inflatable to engage the interior surface 127 of the barrel-shaped part 125 when the body 112 is inside the barrel-shaped part 125. The bladder tubes 130 may be made of any flexible material to allow the bladder tubes 130 to inflate to a larger size. In some embodiments, the bladder tubes 130 are made of a flexible elastomeric material. The bladder tubes 130 may be made of rubber, other thermoset elastomers, or thermoplastic elastomers, etc.

The bladder tubes 130 may be deflated to a smaller size to allow the barrel-shaped part 125 to fit around the fixture 110. Once in position, the bladder tubes 130 are inflated to engage the interior surface 127 of the barrel-shaped part 125. The pressurized bladder tubes 130 increase in size and are compressed between the peripheral channels 118 and the interior surface 127 of the barrel-shaped part 125. The compressed bladder tubes 130 hold the barrel-shaped part 125 in a fixed position to allow for the exterior surface to be worked on.

The bladder tubes 130 are inflated by a pressure system 150 which is couplable to the bladder tubes 130. The pressurized bladder tubes 130 press against the interior surface 127 of the barrel-shaped part 125 and hold the barrel-shaped part 125 in a fixed position. With the barrel-shaped part 125 held in a fixed position, the barrel-shaped part 125 can be worked on or otherwise fabricated. The fixture 110 allows for a user to perform any of a number of processing steps on the barrel-shaped part 125, especially the exterior surface, without putting uneven pressure on the interior surface 127 of the barrel-shaped part 125.

Referring to prior art techniques, current fixtures used to engage interior surfaces of parts utilize radially expandable and contractible sectional rings which are controlled by a mechanical mechanism, or expanding mandrels. The separate sections include rubber seals which engage the interior surface. However, these rubber seals and the sections are not continuous around a perimeter and provide uneven contact with the interior surface of parts. Such uneven contact sometimes leads to movement of the part during processing steps (such as machining). In order to reduce movement of the part, greater torque is sometimes applied to expand the sections and press harder against the interior surface. As a larger torque is applied, the discontinuous rubber seals will apply uneven pressure points to the interior surface of the part and may lead to deformation or distortion of the part during processing steps.

Referring back to FIG. 1, the bladder tubes 130 are continuous around a perimeter of the fixture 110. The continuous bladder tubes 130 are configured to engage the interior surface 127 of the barrel-shaped part 125 evenly. The continuous peripheral pressure applied to the interior surface 127 of the barrel-shaped part 125 reduces or eliminates uneven pressure points that may distort or deform the barrel-shaped part 125. The inflatable bladder tubes 130 enable self-adjusting contact between the interior surface 127 of the barrel-shaped part 125 and the fixture 110 to ensure even distribution of pressure pushing against the interior surface 127. In addition, as described more fully below, some embodiments of the system 100 are configured to equalize pressure between a plurality of bladder tubes 130. The equalized pressure allows for even distribution of pressure among spaced bladder tubes 130.

The bladder tubes 130 may have various cross-section profiles. The bladder tubes 130 may have a circular or non-circular cross-sectional profile. In some embodiments, the bladder tube 130 includes a lens-shaped cross-sectional profile. The cross-sectional profile of the bladder tube 130 may be configured to complement the cross-sectional profile of the peripheral channel 118. That is, the cross-sectional profile of the bladder tube 130 is configured to engage the cavity of the peripheral channel 118 (see, for example, FIG. 7) when the bladder tube 130 is inflated and compressed between the peripheral channel 118 and the interior surface of the barrel-shaped part 125.

The system 100 further includes a pressure system 150. The pressure system 150 is a pneumatic air pressure system. The pressure system 150 is configured to supply pressurized gas to the bladder tubes 130 to inflate the bladder tubes 130. The pressure system 150 includes a gas reservoir 152 including a gas. While described as a gas reservoir 152 with air, it is contemplated that other gases may be utilized. In some embodiments, a fluid reservoir and fluid may also be utilized to pressurize the bladder tubes 130. The pressure system 150 is a pneumatic air pressure system.

The gas reservoir 152 is fluidly connected to the bladder tubes 130. The pressure system 150 includes various components that allow for the pressurizing and de-pressurizing of the bladder tubes 130. The bladder tubes are de-pressurized to allow for the barrel-shaped part 125 to be positioned over the fixture 110. Once in position, the bladder tubes 130 are pressurized by the pressure system to engage the barrel-shaped part 125.

Referring again to FIG. 1, the pressure system 150 includes a pressure regulator 154 coupled along a supply line 167. The supply line 167 runs from the gas reservoir 152 to bladder tubes 130. The pressure regulator 154 is configured to regulate the pressure supplied to the bladder tubes 130. The pressure regulator 154 is configured to manage valves 156 and valve 162 and to regulate the pressure supplied to each of the bladder tubes 130. Although not shown, the pressure system 150 may include further control systems and computer hardware and software configured to automatically regulate pressure in the bladder tubes 130 and control the pressure system 150.

The pressure system 150 further includes a pressure relief valve 158 which can control or limit the pressure in the pressure system 150 to reduce pressure build-up in the pressure system 150, which pressure build-up may damage the bladder tubes 130. The supply line 167 extends from the pressure reservoir 152 up along the body 112 of the fixture 110. The supply line 167 includes connectors 160, 164 which connect the supply line 167 to the bladder tubes 130. Connector 160 is a T-junction connector which splits the supply line 167 and feeds pressurized air to the lower bladder tube 130. The pressure system 150 connects to the lower bladder tube 130 at tube valve 166. The supply line 167 continues along the body 112 extending up to the upper support ring 114. As shown, the supply line 167 extends through the structural support 116 of the upper support ring 114. The connector 164 is an elbow connector which connects the supply line 167 to a tube valve 166 on the upper bladder tube 130. The supply lines can alternatively be flexible hose lines, further enabling modularity of the fixture.

Figure 3:
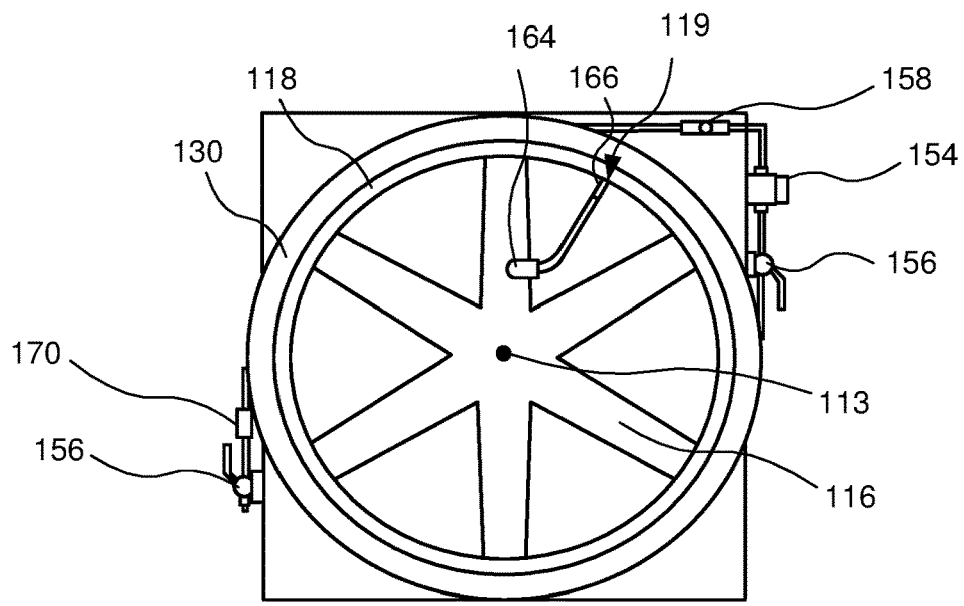
FIG. 3 is a top view of the fixture, according to one or more embodiments of the present disclosure.
Figure 4:
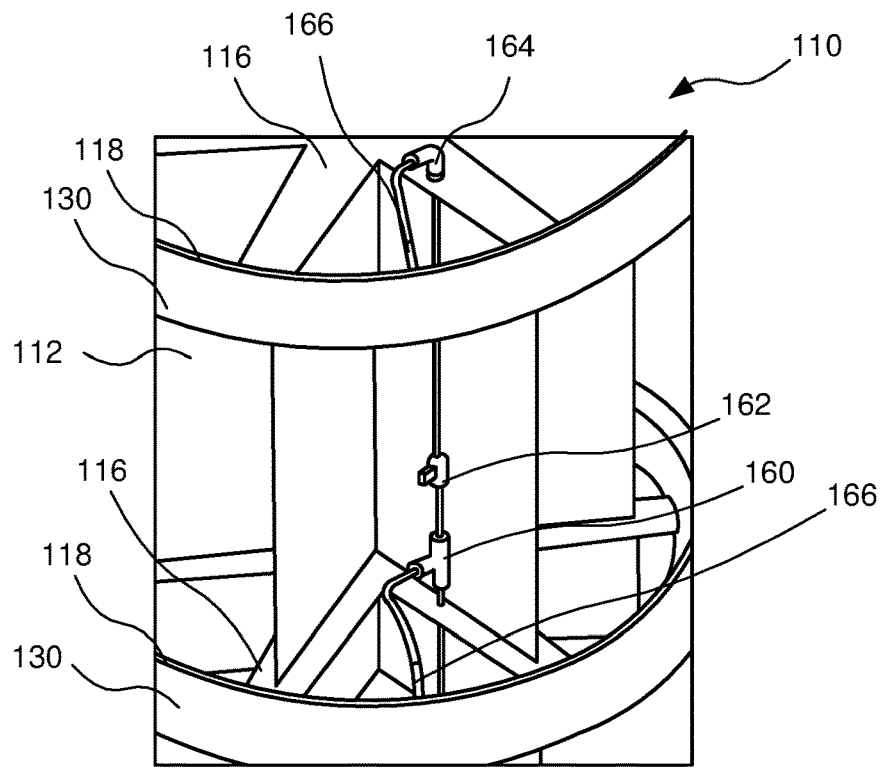
FIG. 4 is a partial perspective view of the fixture, according to one or more embodiments of the present disclosure.
Figure 5:
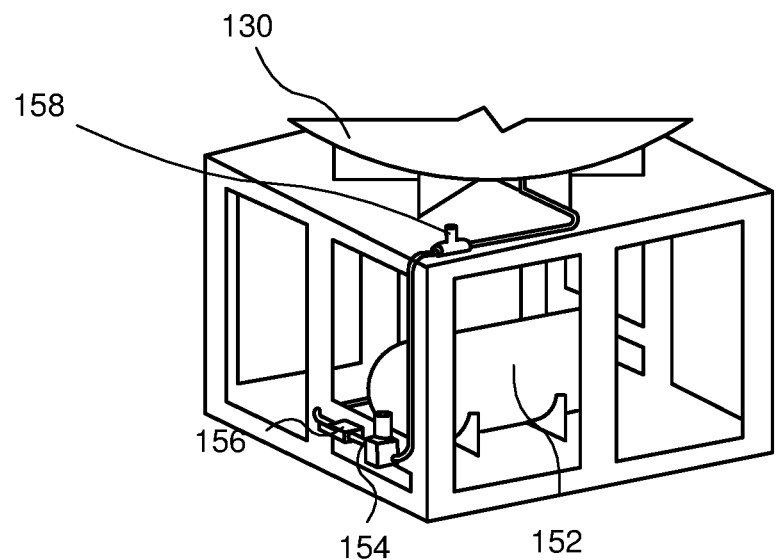
FIG. 5 is a perspective view of a gas reservoir, according to one or more embodiments of the present disclosure.

Referring to FIG. 3, the peripheral channel 118 of the support ring 114 includes an aperture 119. The aperture 119 provides access to the bladder tube 130 positioned around the perimeter of the peripheral channel 118. The tube valve 166 of the bladder tube 130 extends through the aperture 119 and connects to the pressure system 150.

Figure 6:
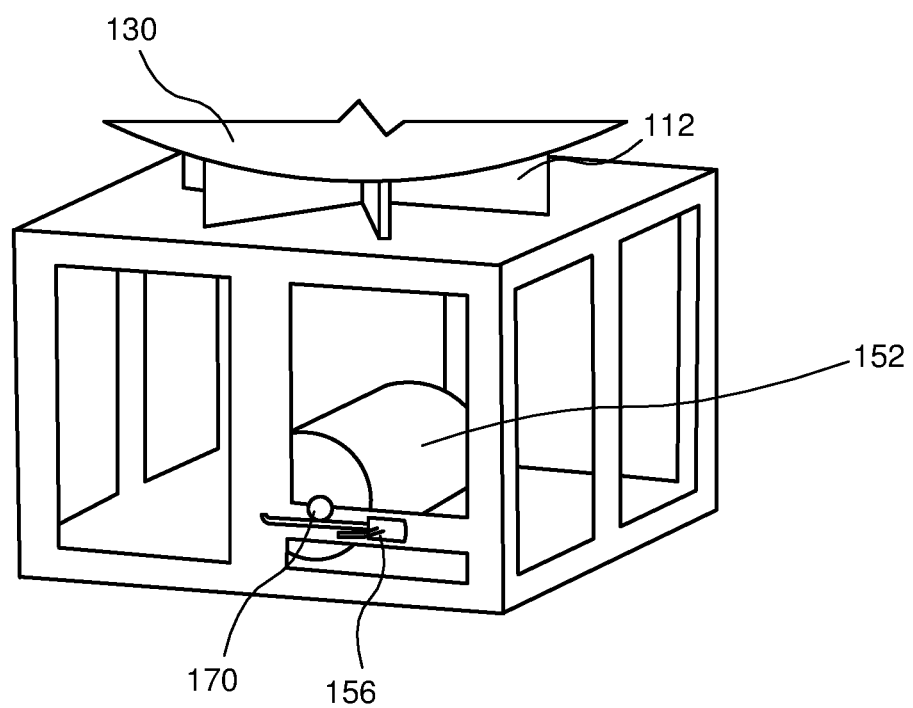
FIG. 6 is a rear view of the gas reservoir, according to one or more embodiments of the present disclosure.

Referring to FIG. 6, the pressure system 150 further includes a pressure meter or pressure gauge 170 and valve 156. The pressure gauge 170 measures the pressure in the pressure system 150 and through sensors (not shown) can transmit the pressure readings to the pressure regulator or a control system.

The pressure system 150 is configured to regulate the pressure supplied to both bladder tubes 130. In some embodiments, the pressure system 150 is configured to equalize the pressure of the gas within the bladder tubes 130. The equalized pressure provides an even pressure against the interior surface 127 of the barrel-shaped part 125. In other embodiments, the pressure system 150 may be configured to provide an unequalized pressure to the bladder tubes 130.

Figure 8:
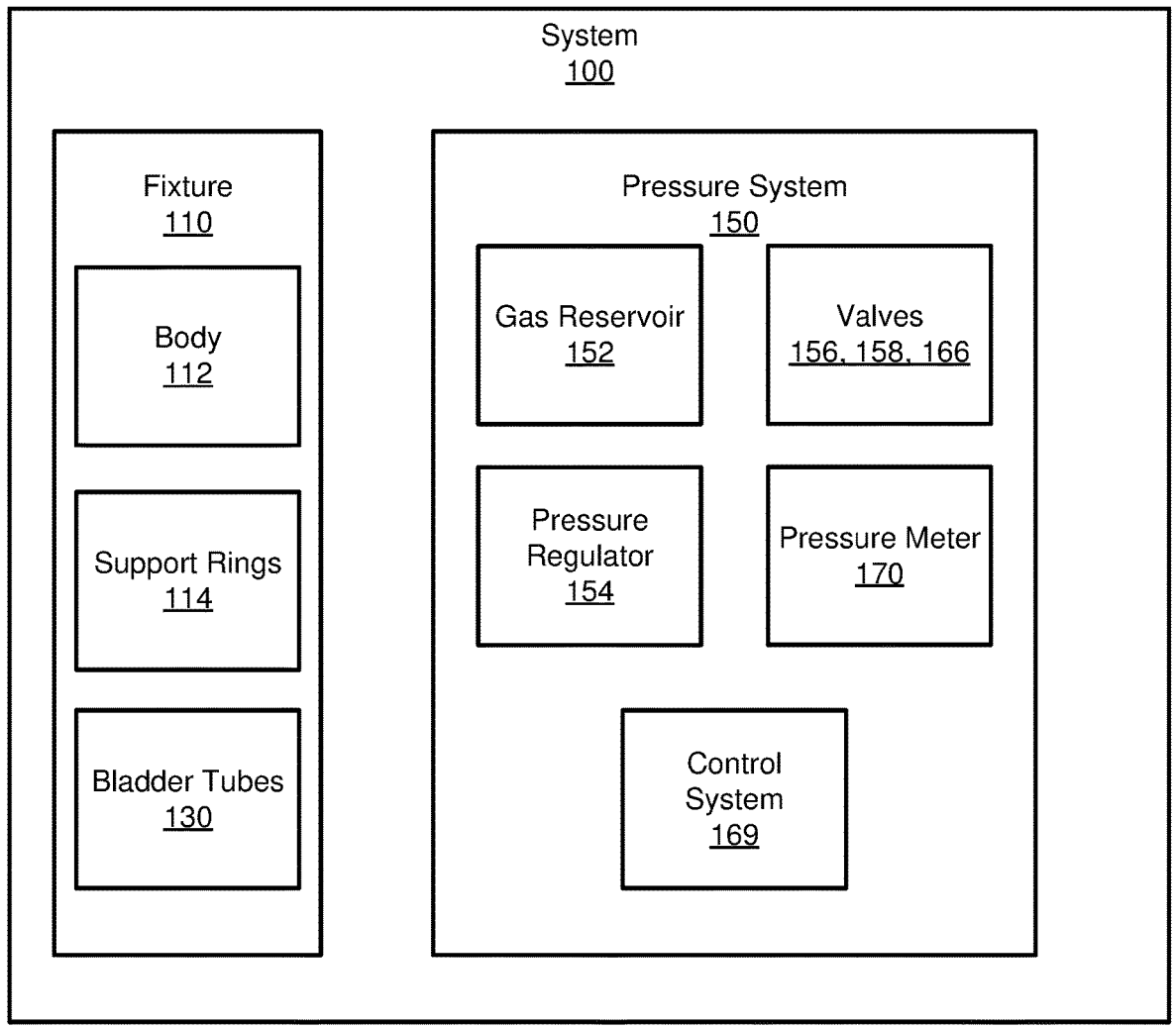
FIG. 8 is a block diagram of a system including a pressure system and a fixture for holding a barrel-shaped part in a fixed position, according to one or more embodiments of the present disclosure.

Referring now to FIG. 8, a block diagram of a system 100 is shown. The system 100 is configured to hold a part with an interior surface in a fixed position. The system 100 includes a fixture 110 and a pressure system 150. The system 100 may include some or all of the features described herein in conjunction with the remaining figures. The pressure system 150 includes a control system 169. The control system 169 is configured to control and regulate the pressure supplied to the bladder tubes 130.

The control system 169 may include various components, not illustrated, to allow for control of the components of the system 100 described herein, such as, but not limited to, processors, memory, computer hardware and software, and modules. The control system 169 may be further configured to measure or receive the pressure applied to the part by the bladder tubes 130 and adjust the pressure supplied to the bladder tubes accordingly.

Figure 9:
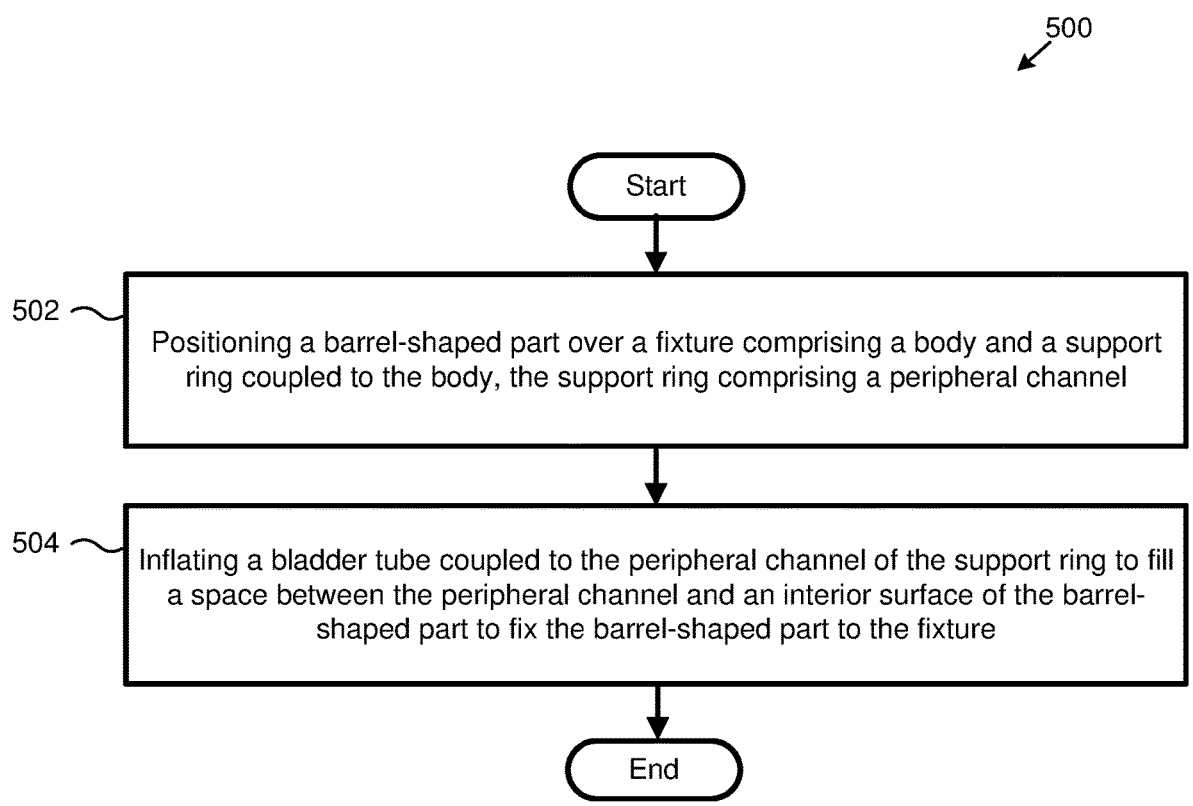
FIG. 9 is a schematic flow diagram of a method of fixing a barrel-shaped part to a fixture, according to one or more embodiments of the present disclosure.

Now referring to FIG. 9, one embodiment of a method 500 is shown. The method 500 includes positioning a barrel-shaped part over a fixture including a body and a support ring coupled to the body, the support ring including a peripheral channel at 502. At 504, the method 500 includes inflating a bladder tube coupled to the peripheral channel of the support ring to fill a space between the peripheral channel and an interior surface of the barrel-shaped part to fix the barrel-shaped part to the fixture. The method then ends.

In some embodiments, the method may further include fabricating an exterior surface of the barrel-shaped part while the barrel-shaped part is fixed to the fixture.

In some embodiments, the method may include inflating a plurality of bladder tubes coupled to respective peripheral channels of a plurality of support rings to fix the barrel-shaped part to the fixture. In some embodiments, the stack-up includes titanium. In some embodiments, the method may include inflating the plurality of bladder tubes to an equalized pressure. In some embodiments, the method may include inflating the plurality of bladder tubes to different pressures.

Although described in a depicted order, the method may proceed in any of a number of ordered combinations.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagram included herein is generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A fixture for holding a hollow barrel-shaped part, comprising an interior surface and an opening on one side, in a fixed position, the fixture comprising:
   a body configured to removably fit inside the hollow barrel-shaped part through the opening on the one side of the hollow barrel-shaped part;
   a set of support rings coupled to the body, each support ring comprising a respective peripheral channel; and a bladder tube engaged with the peripheral channel of the support ring and inflatable to directly contact and press against only a portion of the interior surface of the hollow barrel-shaped part to hold the hollow barrel-shaped part in a fixed position when the body is inside the hollow barrel-shaped part and the bladder is inflated, wherein:
the set of support rings comprises a first support ring and a second support ring spaced apart along a central axis;
the first support ring comprises a first plurality of structural supports;
the second support ring comprises a second plurality of structural supports;
the body comprises a plurality of fin-shaped panels coupled between the first support ring and the second support ring; and
each fin-shaped panel extends from a respective first structural support in the first plurality of structural supports to a respective second structural support in the second plurality of structural supports along a length of the central axis.

2. The fixture according to claim 1, wherein:
the set of support rings comprises a plurality of support rings coupled to the body; and
the fixture further comprises a plurality of bladder tubes each engaged with the peripheral channel of a respective support ring of the plurality of support rings.

3. The fixture according to claim 2, wherein a shape of one of the plurality of support rings is different than a shape of another one of the plurality of support rings.

4. The fixture according to claim 2, wherein
the plurality of support rings are spaced apart along the central axis.

5. The fixture according to claim 1, wherein the bladder tube comprises a non-circular cross-sectional profile.

6. The fixture according to claim 5, wherein the bladder tube comprises a lens-shaped cross-sectional profile.

7. The fixture according to claim 1, wherein a support ring in the set of support rings includes a non-circular shape.

8. The fixture according to claim 1, wherein a support ring in the set of support rings includes a circular shape.

9. The fixture according to claim 1, wherein the bladder tube is made of a flexible elastomeric material.

10. The fixture according to claim 1, wherein a peripheral channel of a support ring in the set of support rings includes a continuous ring surrounding the body.

11. The fixture according to claim 1, wherein a peripheral channel of a support ring in the set of support rings includes a U-shaped cross-sectional profile.

12. A system comprising:
a gas reservoir configured to store a gas; and
a fixture for holding a hollow barrel-shaped part, comprising an interior surface and an opening on one side, in a fixed position, the fixture comprising:
a body configured to removably fit inside the hollow barrel-shaped part through the opening on the one side of the hollow barrel-shaped part;
a set of support rings coupled to the body, each support ring comprising a respective peripheral channel; and
a bladder tube engaged with the peripheral channel of the support ring and inflatable with the gas from the gas reservoir to directly contact and press against only a portion of the interior surface of the hollow barrel-shaped part to hold the hollow barrel-shaped part in a fixed position when the body is inside the hollow barrel-shaped part and the bladder tube is inflated, wherein:
the set of support rings comprises a first support ring and a second support ring spaced apart along a central axis;
the first support ring comprises a first plurality of structural supports;
the second support ring comprises a second plurality of structural supports;
the body comprises a plurality of fin-shaped panels coupled between the first support ring and the second support ring; and
each fin-shaped panel extends from a respective first structural support in the first plurality of structural supports to a respective second structural support in the second plurality of structural supports along a length of the central axis.

13. The system according to claim 12, wherein:
the set of support rings comprises a plurality of support rings coupled to the body;
the plurality of support rings are spaced apart along the body; and
the fixture further comprises a plurality of bladder tubes each engaged with the peripheral channel of a respective support ring of the plurality of support rings and each inflatable with the gas from the gas reservoir.

14. The system according to claim 13, further comprising a pressure regulator configured to equalize pressure of gas within the plurality of bladder tubes.

15. The system according to claim 12, wherein a peripheral channel of a support ring in the set of support rings comprises an aperture through which gas from the gas reservoir flows into the bladder tube.

16. The system according to claim 12, wherein the bladder tube comprises one of a non-circular cross-sectional profile and a lens-shaped cross-sectional profile.

17. The system according to claim 12, wherein a support ring in the set of support rings includes one of a circular shape and a non-circular shape.

18. The system according to claim 12, wherein a peripheral channel of a support ring in the set of support rings includes one of a continuous ring surrounding the body and a U-shaped cross-sectional profile.

19. The system according to claim 12, wherein the bladder tube is made of a flexible elastomeric material.

20. The system according to claim 12, wherein the plurality of fin-shaped panels includes six fin-shaped panels.

* * * * *